US009900837B2

(12) United States Patent
Chen et al.

(10) Patent No.: US 9,900,837 B2
(45) Date of Patent: Feb. 20, 2018

(54) MULTI-CHANNEL COMMUNICATIONS FOR SENDING PUSH NOTIFICATIONS TO MOBILE DEVICES

(71) Applicant: Google Inc., Mountain View, CA (US)

(72) Inventors: Yuyang Chen, Mountain View, CA (US); Yun Zhou, Bothell, WA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/178,074

(22) Filed: Jun. 9, 2016

(65) Prior Publication Data

US 2017/0359778 A1 Dec. 14, 2017

(51) Int. Cl.
H04W 52/02 (2009.01)
H04L 29/08 (2006.01)
H04M 1/253 (2006.01)
H04W 24/02 (2009.01)
H04W 72/10 (2009.01)
H04W 4/12 (2009.01)

(52) U.S. Cl.
CPC ......... *H04W 52/0209* (2013.01); *H04L 67/26* (2013.01); *H04M 1/2535* (2013.01); *H04W 4/12* (2013.01); *H04W 24/02* (2013.01); *H04W 72/10* (2013.01)

(58) Field of Classification Search
CPC ... H04W 52/0209; H04W 4/12; H04W 24/02; H04W 72/10; H04L 67/26; H04M 1/2535
See application file for complete search history.

(56) References Cited

U.S. PATENT DOCUMENTS

| 2007/0195761 | A1* | 8/2007 | Tatar | H04L 49/1546 370/389 |
| 2010/0094710 | A1* | 4/2010 | Ramakrishna | G06Q 30/02 705/14.64 |
| 2014/0362768 | A1 | 12/2014 | Wood et al. | |
| 2015/0019654 | A1 | 1/2015 | Wheeler et al. | |

(Continued)

FOREIGN PATENT DOCUMENTS

WO 2011/137282 11/2011

OTHER PUBLICATIONS

Slack.com, Using Slack: Get to know the basics, and a few helpful tips & tricks along the way!, https://get.slack.help/hc/cn-us/categories/200111606-Using-Slack at least as early as Jan. 20, 2016, 4 pgs.

(Continued)

*Primary Examiner* — Mohammad Anwar
(74) *Attorney, Agent, or Firm* — Patent Law Works LLP

(57) ABSTRACT

A system and method for sending push notifications over different channels for different types of traffic is disclosed. The method includes establishing a first communication channel with a computing device, establishing a second communication channel with the computing device, associating a first category with the first communication channel, the first category having a first set of message types, associating a second category with the second communication channel, the second category having a second set of message types, receiving a message, determining a category for the message from the first category and the second category, and sending the message to the computing device using a communication channel associated with the determined category.

21 Claims, 8 Drawing Sheets

(56) References Cited

U.S. PATENT DOCUMENTS

2015/0089008 A1    3/2015  Sridharan et al.
2015/0113442 A1    4/2015  Aghadavoodi Jolfaei
2015/0347205 A1*  12/2015  Stanley-Marbell ..... G06F 9/542
                                                                                                                                                                            719/318

OTHER PUBLICATIONS

Extended European Search Report for EP Application No. 17167455.9, dated Aug. 30, 2017, 11 pgs.

* cited by examiner

| Notification Type | High Priority | Low Priority | ... | Permanent State | Ephemeral State | ... | Family | Others | ... | Background | Foreground | ... |
|---|---|---|---|---|---|---|---|---|---|---|---|---|
| Typing |  | X |  |  | X |  |  |  |  |  |  |  |
| Focused |  | X |  |  | X |  |  |  |  |  |  |  |
| Away |  | X |  |  | X |  |  |  |  |  |  |  |
| Self Watermark | X |  |  | X |  |  |  |  |  |  |  |  |
| Send Chat message | X |  |  | X |  |  |  |  |  |  |  |  |
| Join conference | X |  |  | X |  |  |  |  |  |  |  |  |
| Leave Conference | X |  |  | X |  |  |  |  |  |  |  |  |
| Active client |  | X |  | X |  |  |  |  |  |  |  |  |
| Presence |  | X |  | X |  |  |  |  |  |  |  |  |
| Update |  |  |  | X |  |  |  |  |  |  |  |  |
| Alert |  |  |  | X | X |  |  |  |  |  |  |  |
| Event occurring |  |  |  | X |  |  |  |  |  |  |  |  |
| Data for download |  |  |  | X |  |  |  |  |  |  |  |  |
| Status |  |  |  |  |  |  |  |  |  |  |  |  |
| ... |  |  |  |  |  |  |  |  |  |  |  |  |
| Channel Assignment | 1 | 2 |  | 3 | 4 |  |  |  |  |  |  |  |

Figure 7

MULTI-CHANNEL COMMUNICATIONS FOR SENDING PUSH NOTIFICATIONS TO MOBILE DEVICES

BACKGROUND

For messaging and/or Voice over Internet Protocol (VoIP) applications, a server sends a rich set of notifications to mobile devices or clients. Certain conventional techniques use a single communication channel to send notifications from the server to the client. A communication channel refers a logical connection for sending and receiving data over a multiplexed medium. This one channel is used to deliver all notifications without prioritizing notifications based on their types. The type of the notification or message is used to define the function of the notification or message being sent. This leads to a variety of inefficiencies for data usage, data traffic, battery life, and server resources. For example, some notifications can be unnecessary to user when the application (e.g., any program or group of programs operating on a computing device designed for the end user) is operating in background, e.g., notifications that tell whether a user is typing text or not. In contrast, other notifications are important even if the application is running in background, for example, a new chat message arrives. Because messages for different applications all use the same channel, any one application could be consuming more data and battery than necessary. Moreover, while the devices are processing unimportant or unnecessary notifications, important notifications may be lost or delayed in their processing.

SUMMARY

Example implementations provide a system and method for sending push notifications over different channels for different types of traffic. According to one aspect of the subject matter described in this disclosure, a method for using multiple channels to send messages with different categorizations comprises: establishing a first communication channel with a computing device, establishing a second communication channel with the computing device, associating a first category with the first communication channel, the first category having a first set of message types, associating a second category with the second communication channel, the second category having a second set of message types, receiving a message, determining a category for the message from the first category or the second category, and sending the message to the computing device using a communication channel associated with the determined category.

In general, another aspect of the subject matter described in this disclosure may be embodied in methods that include determining a type of the message, and comparing the type of the message to the first set of message types and the second set of message types to identify the determined category for the message.

According to other aspects of the subject matter described in this disclosure, the message is a push notification for a mobile application operating on a portable computing device, the first communication channel is for high priority messages and the second communication channel is for low priority messages, or the first communication channel is for messages to a first application operating in a foreground and the second communication channel is for messages to a second application operating in a background.

Another aspect of the subject matter described in this disclosure may be embodied in methods that include determining whether applications associated with the second communication channel are operating in a background, and deactivating the second communication channel in response to a determination that the applications associated with the second communication channel are operating in the background.

Another aspect of the subject matter described in this disclosure may be embodied in methods that include receiving a factor for communication using the first communication channel and the second communication channel, determining categories available to assign to the first communication channel and the second communication channel, and automatically assigning the categories to the first communication channel and the second communication channel to improve performance of the factor. According to some aspects of the subject matter described, the factor is one from the group of traffic between the computing device and a server, data usage by the computing device, battery consumption by the computing device, reliability of message delivery, and utilization of resources of the server.

Other implementations of one or more of these aspects include corresponding systems, apparatus, methods, non-transitory computer readable media, and computer programs products.

The specification describes a system and method for using multiple communication channels to send push notifications to a mobile device that has a number of advantages. First, the system and method of the present disclosure are particularly advantageous because they result in less traffic and thus less data usage for mobile devices. Second, the system and method of the present disclosure advantageously reduce battery consumption by the mobile device. Third, the system and method of the present disclosure advantageously reduce the server resources needed to send push notifications.

BRIEF DESCRIPTION OF THE DRAWINGS

The specification is illustrated by way of example, and not by way of limitation in the figures of the accompanying drawings in which like reference numerals are used to refer to similar elements.

FIG. 7 is a graphical representation of a data structure illustrating example notification types, notification categories and associations.

DETAILED DESCRIPTION

Certain implementations provide computer systems and computer-executed methods for sending notification messages to mobile devices. More particularly, the specification relates to using multiple channels for sending push notifications to mobile computing devices.

The system and method solve the technical problems identified above by providing multiple communication channels for communication with a mobile computing device. More specifically in some implementations, the system creates a plurality of communication channels between the mobile computing device and the notification server. Each of the communication channels is assigned a category that includes a set of message types that are sent over the communication channel. Before a message is sent, the type of message and its corresponding category are determined. Then the message is sent over the channel which is assigned to send and receive that category of messages. The message once received may be processed based on category known for the channel upon which the message was delivered. This system and method are advantageous because in one implementation, one channel is dedicated to high priority messages and another channel is dedicated to low priority messages, thus improving the reliability that high priority message will be delivered. In another implementation, the statuses of applications are monitored and when the applications using a particular channel are operating in the background, that channel can temporarily be deactivated to conserve battery life of the mobile computing device. In yet another implementation, messages associated with a particular channel may not be sent from the notification server, for example, when an application is operating in the background, thereby conserving server resources, reducing network traffic, and reducing data usage of the mobile device. While the system and method will now be described in terms of push notifications for applications operating on user devices or client devices (mobile computing devices), it should be understood that the principles of the present disclosure are applicable to other messaging systems and frameworks that establish a plurality of communication channels. In some implementations, a push notification may notify an occurrence of one or more events associated with an application on the user device. In some implementations, the push notifications may be processed and delivered to the associated application even when the application is not launched on the user device, when the user is not actively using the user device, or when the user is not actively using the application on the user device.

Figure 1:
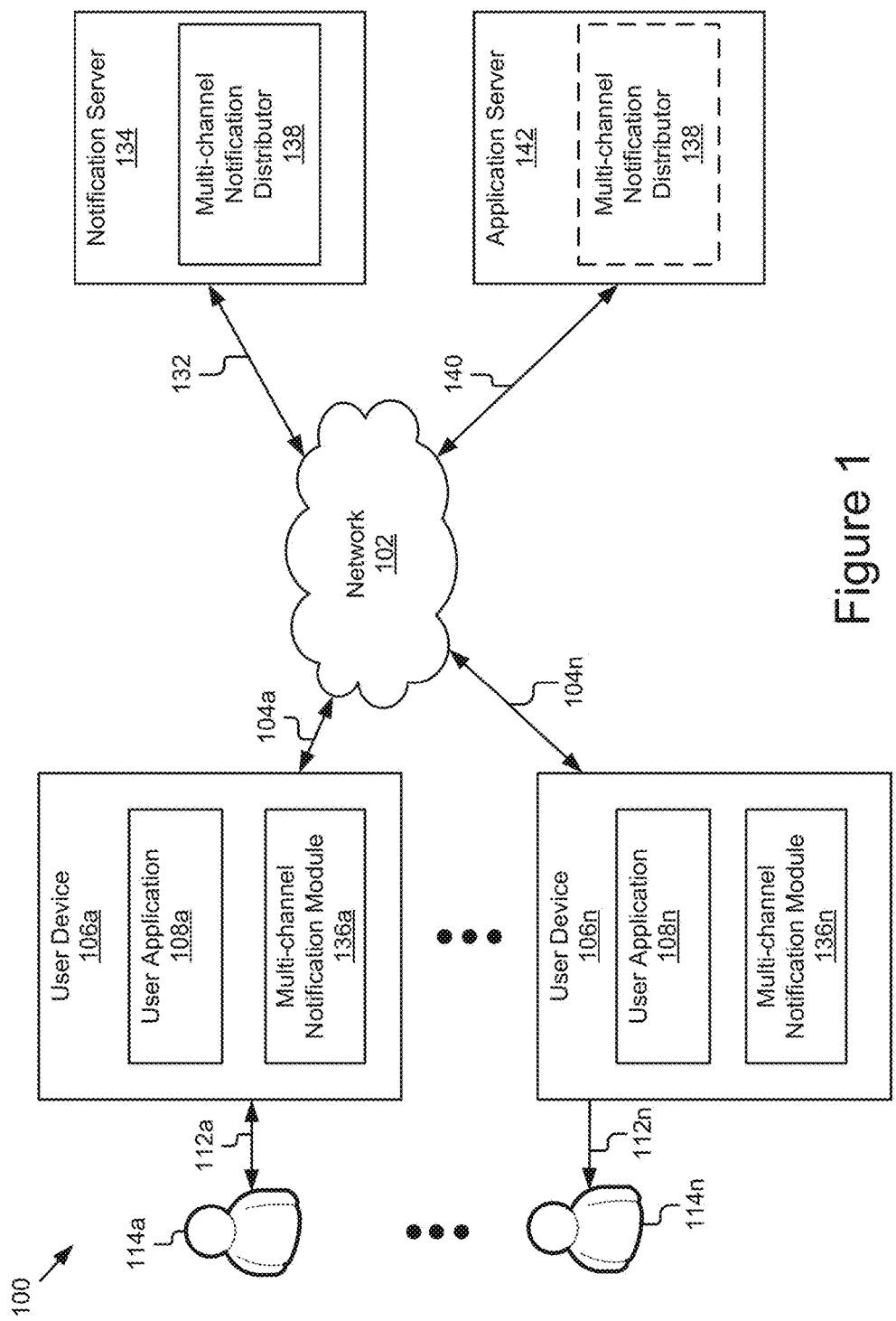
FIG. 1 is a block diagram illustrating an example system for providing multiple communication channels for sending notifications to computing devices.

FIG. 1 illustrates a block diagram of an example system 100 for providing multiple communication channels for sending notifications to computing devices 106. The system 100 as illustrated has user (or client) devices 106a through 106n, which are typically utilized by users 114a through 114n to access servers hosting websites via a network 102. The system 100 may include a notification server 134 and an application server 142 by way of example. In the illustrated example, these entities are communicatively coupled via the network 102.

It should be recognized that in FIG. 1 as well as other figures used to illustrate the present disclosure, an indication of a letter after a reference number or numeral, for example, "106a" is a specific reference to the element or component that is designated by that particular reference numeral. In the event a reference numeral appears in the text without a letter following it, for example, "106," it should be recognized that such is a general reference to different implementations of the element or component bearing that general reference numeral. Moreover, though only two user devices are illustrated in FIG. 1, it should be understood that any number of client devices 106n may be used by any number of users 114n.

The network 102 may be a conventional type, wired or wireless, and may have numerous different configurations including a star configuration, token ring configuration or other configurations. Furthermore, the network 102 may include a local area network (LAN), a wide area network (WAN) (e.g., the Internet), and/or other interconnected data paths across which multiple devices may communicate. In some implementations, the network 102 may be a peer-to-peer network. The network 102 may also be coupled to or may include portions of a telecommunications network for sending data in a variety of different communication protocols. In some other implementations, the network 102 may include Bluetooth communication networks or a cellular communications network for sending and receiving data including via short messaging service (SMS), multimedia messaging service (MMS), hypertext transfer protocol (HTTP), direct data connection, wireless access protocol (WAP), email, etc. In addition, although FIG. 1 illustrates a single network 102 coupled to the user devices 106 that are illustrated and the servers 134, 142, in practice, one or more networks 102 may be connected to these entities.

The user devices 106a through 106n in FIG. 1 are used by way of example. Although only two user devices 106 are illustrated, the present disclosure applies to a system architecture having any number of user devices 106 available to any number of users 114. In the illustrated implementation, the users 114a through 114n interact with the user device 106a and 106n, via signal lines 112a through 112n, respectively. The user devices 106a through 106n are communicatively coupled to the network 102 via signal lines 104a through 104n respectively.

In some implementations, the user device 106 (any or all of the user devices 106a through 106n) can be any computing device that includes a memory and a processor, as described in more detail below with reference to FIG. 2A. For example, the user device 106 can be a laptop computer, a desktop computer, a tablet computer, a mobile telephone, a smart phone, a personal digital assistant, a mobile email device, a portable game player, a portable music player, a television with one or more processors embedded therein or coupled thereto, or any other electronic device capable of accessing the network 102, etc.

In some implementations, the user devices 106a through 106n comprise a user application 108 (illustrated as 108a through 108n) and a multi-channel notification module 136 (illustrated as 136a through 136n). The user 114 (114a through 114n) may use the user application 108 to exchange information with the multi-channel notification module 136, the notification server 134, and the application server 142, as appropriate to accomplish the operations of the present disclosure. As one example, the user 114 may have a several applications 108 operational on the user device 106 that receive and send notifications about status and a variety of other conditions to and from the notification server 134 and the application server 142. For example, such applications may include social networking applications, messaging applications, photo sharing applications, video conferencing applications, etc. The processing of notifications for those applications 108 are handled by the multi-channel notification module 136 as will be described in more detail below with reference to FIG. 2A.

The notification server 134 may be a computing device that includes a processor, a memory and network communication capabilities. The notification server 134 is coupled to the network 102, via a signal line 132. The notification server 134 may be configured to send notification messages to the user devices 106 (106a through 106n), via the network 102. The notification server 134 may also be configured to receive status and other information from the user devices 106 (106a through 106n), via the network 102. In some embodiments, the notifications and status information are sent from the application server 142 to the notification server 134 for delivery to the user devices 106. Although only one notification server 134 is shown, it should be recognized that multiple servers may be used, either in a distributed architecture or otherwise. For the purpose of this application, the system configuration and operations performed by the system are described in the context of a single notification server 134.

In some implementations, the notification server 134 comprises a multi-channel notification distributor 138 for processing notifications, establishing multiple communication channels with the user device 106 and managing the multiple communication channels. More specifically, the multi-channel notification distributor 138 may cooperate and communicate with the multi-channel notification module 136 of the user device 106 to provide the functionality described below. The multi-channel notification distributor 138 may receive user input from the user application 108 to define categories and assign the defined categories to communication channels as will be described below. The multi-channel notification distributor 138 may receive user factors and their importance from the user and may automatically set up the channels and categories to improve performance of the selected factor. The multi-channel notification distributor 138 may route messages between the application server 142 and the multi-channel notification module 136 via the multiple communication channels it creates. By way of another example, the multi-channel notification distributor 138 can also dynamically activate and deactivate communication channels to reduce battery consumption of the user device 106.

The application server 142 may be a computing device that includes a processor, a memory and network communication capabilities. The application server 142 is coupled to the network 102, via a signal line 140. The application server 142 may be configured to include the multi-channel notification distributor 138 in some embodiments. The application server 142 is a server for handling application operations and facilitating interoperation with backend systems. Although only a single application server 142 is shown, it should be understood that there could be any number of application servers 142 sending notifications to the user device 106 via the notification server 134. The application server 142 may send notification messages to the user devices 106 (106a through 106n), via the network 102 and the notification server 134. The application server 142 may also be configured to receive status and other information from the user devices 106 (106a through 106n), via the network 102.

As depicted in FIG. 1, the multi-channel notification distributor 138 is shown in dotted lines to indicate that the operations performed by the multi-channel notification distributor 138 as described herein can be performed either by the notification server 134 or the application server 142, or a combination of the two. Additional structure, acts, and/or functionality of the multi-channel notification distributor 138 is described in further detail below with respect to at least FIG. 2B.

Figure 2A:
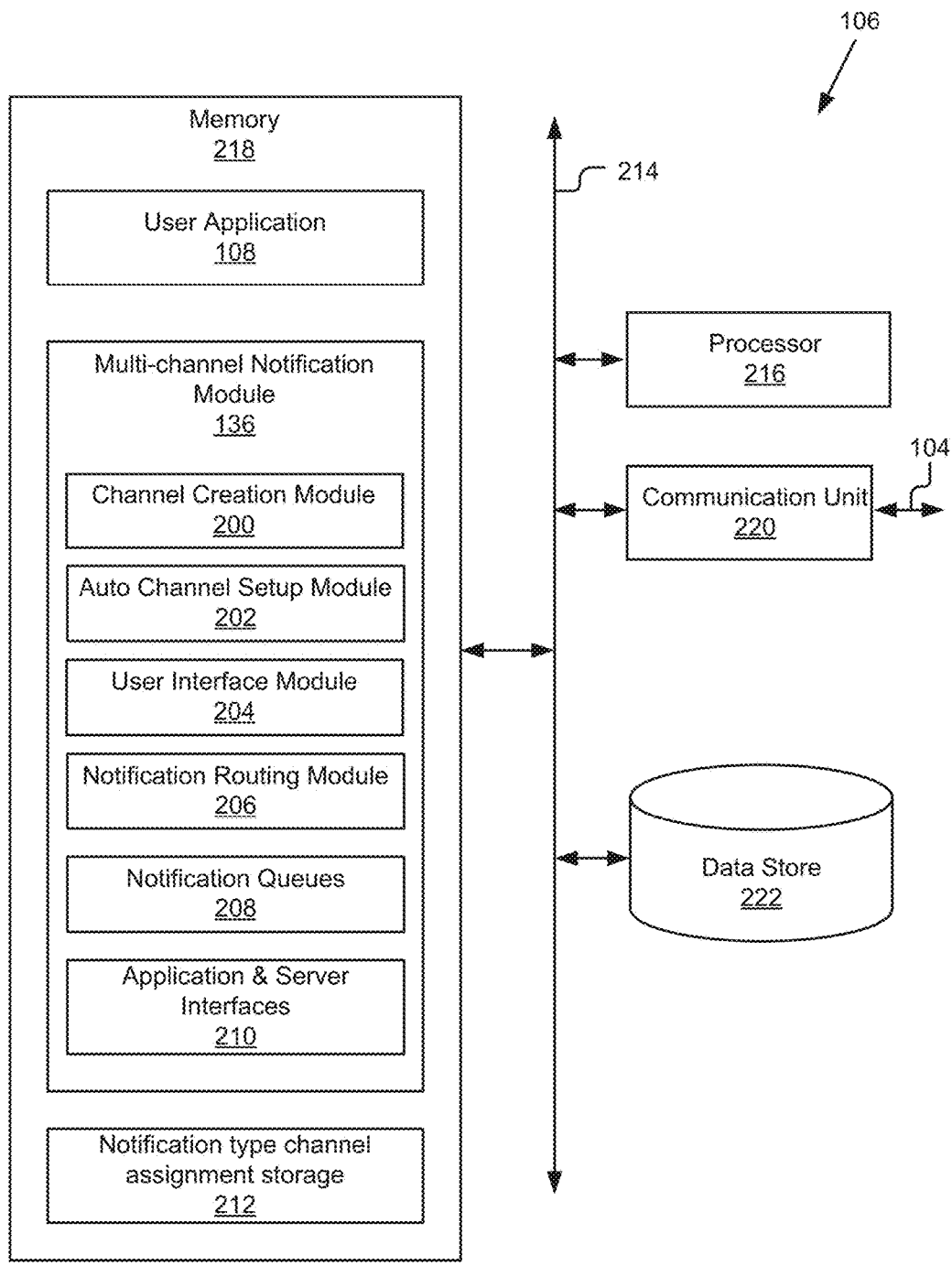
FIG. 2A is a block diagram illustrating an example mobile computing device including a multi-channel notification module.
Figure 2B:
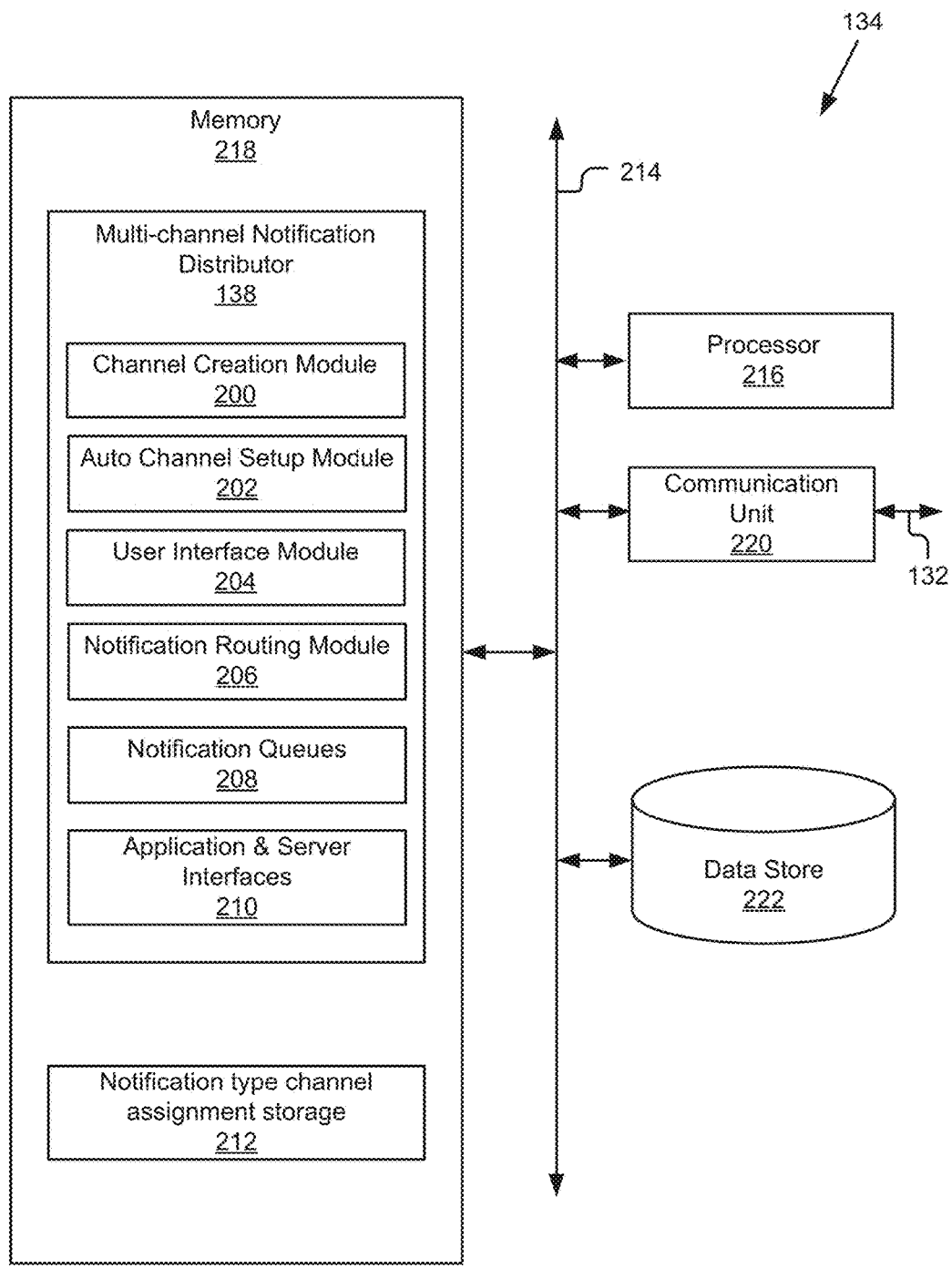
FIG. 2B is a block diagram illustrating an example hardware server including a multi-channel notification distributor.

FIG. 2A is a block diagram of an example computing device, e.g., a mobile phone, which may be representative of the user device 106 and includes the multi-channel notification module 136. In contrast, FIG. 2B is a block diagram of the notification server and includes the multi-channel notification distributor 138. While the multi-channel notification module 136 and the multi-channel notification distributor 138 have some similar functionality, they also have differing functionality which is described below with reference to FIGS. 2A and 2B below.

FIG. 2A is a block diagram of an example computing device, which may be representative of the user device 106. As depicted, the user device 106 may include a processor 216, a memory 218, a communication unit 220, and a data store 222, which may be communicatively coupled by a communication bus 214. The memory 218 may include one or more of the user application 108, multi-channel notification module 136, and the notification type channel assignment storage 212.

Depending upon the configuration, the computing device may include differing components. For instance, in an example server-side implementation, the computing device may include the multi-channel notification distributor 138. In an example client-side implementation, the computing device may include the user application 108, and/or the multi-channel notification module 136. It should be understood that the above configurations are provided by way of example and numerous further configurations are contemplated and possible.

The processor 216 may execute software instructions by performing various input, logical, and/or mathematical operations. The processor 216 may have various computing architectures to process data signals including, for example, a complex instruction set computer (CISC) architecture, a reduced instruction set computer (RISC) architecture, and/or an architecture implementing a combination of instruction sets. The processor 216 may be physical and/or virtual, and may include a single core or plurality of processing units and/or cores. In some implementations, the processor 216 may be capable of generating and providing electronic display signals to a display device, supporting the display of images, capturing and transmitting images, performing complex tasks including various types of feature extraction and sampling, etc. In some implementations, the processor 216 may be coupled to the memory 218 via the bus 214 to access data and instructions therefrom and store data therein. The bus 214 may couple the processor 216 to the other components of the user device 106 including, for example, the memory 218, communication unit 220, and the data store 222.

The memory 218 may store and provide access to data to the other components of the user device 106. In some implementations, the memory 218 may store instructions and/or data that may be executed by the processor 216. The memory 218 is also capable of storing other instructions and data, including, for example, an operating system, hardware drivers, other software applications, databases, etc. The memory 218 may be coupled to the bus 214 for communication with the processor 216 and the other components of the user device 106.

The memory 218 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor 216. In some implementations, the memory 218 may include one or more of volatile memory and non-volatile memory (e.g., RAM, ROM, hard disk, optical disk, etc.). It should be understood that the memory 218 may be a single device or may include multiple types of devices and configurations.

The bus 214 can include a communication bus for transferring data between components of a computing device or between computing devices, a network bus system including the network 102 or portions thereof, a processor mesh, a combination thereof, etc. In some implementations, the user application 108 and the multi-channel notification module 136 may cooperate and communicate via a software communication mechanism implemented in association with the bus 214. The software communication mechanism can include and/or facilitate, for example, inter-process communication, local function or procedure calls, remote procedure calls, network-based communication, secure communication, etc.

The communication unit 220 may include one or more interface devices for wired and wireless connectivity with the network 102 and the other entities and/or components of the system 100 including, for example, the user devices 106, the notification server 134, and the data store 222, etc. For instance, the communication unit 220 may include, but is not limited to, CAT-type interfaces; wireless transceivers for sending and receiving signals using Wi-Fi™; Bluetooth®, cellular communications, etc.; USB interfaces; various combinations thereof; etc. The communication unit 220 may be coupled to the network 102 via the signal lines 104 and/or 132. In some implementations, the communication unit 220 can link the processor 216 to the network 102, which may in turn be coupled to other processing systems. The communication unit 220 can provide other connections to the network 102 and to other entities of the system 100 using various standard communication protocols, including, for example, those discussed elsewhere herein.

The data store 222 is an information source for storing and providing access to data. In some implementations, the data store 222 may be coupled to the components 216, 218, 220, 108, and/or 136 of the user device 106 via the bus 214 to receive and provide access to data. In some implementations, the data store 222 may store data received from the other entities 106 and/or 134 of the system 100, and provide data access to these entities. The data store 222 can include one or more non-transitory computer-readable media for storing the data. In some implementations, the data store 222 may be incorporated with the memory 218 or may be distinct therefrom. In some implementations, the data store 222 may include a database management system (DBMS). For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

As depicted in FIG. 2A, the memory 218 may include the user application 108, the multi-channel notification module 136 and the notification type channel assignment storage 212.

The user application 108 is representative of any user application that is operational on the user device 106. As noted above, the user application 108 may be a social networking application, messaging application, photo sharing application, video conferencing application, etc. The user application 108 may be coupled for communication with the multi-channel notification module 136 to receive notifications from the application server 142 and send status, commands and other information to the application server 142. In some implementations the user application 108 may communicate through the notification server 134 to the application server 142. For example, communications are from the user application 108 to the multi-channel notification module 136 of the user device 106, then to the multi-channel notification distributor 138 of the notification server 134, which in turn send the information to the application server 142.

As depicted, the multi-channel notification module 136 includes a channel creation module 200, an automatic channel set up module 202, a user interface module 204, a notification routing module 206, one or more notification queues 208, and application and server interfaces 210. The components 200, 202, 204, 206, 208, and 210 of the multi-channel notification module 136 are coupled for communication with each other and the other components 108, 216, 218, 220, and 222 of the user device 106. The components 200, 202, 204, 206, 208, and 210 are also coupled to the network 102 via the communication unit 220 for communication with the other entities of the system 100.

In some implementations, the channel creation module 200, the automatic channel set up module 202, the user interface module 204, the notification routing module 206, one or more notification queues 208 and application and server interfaces 210 are sets of instructions executable by the processor 216 to provide their respective acts and/or functionality. In other implementations, the channel creation module 200, the automatic channel set up module 202, the user interface module 204, the notification routing module 206, one or more notification queues 208 and application and server interfaces 210 may be stored in the memory 218 of the user device 106 and may be accessible and executable by the processor 216 to provide their respective acts and/or functionality. In any of these implementations, the channel creation module 200, the automatic channel set up module 202, the user interface module 204, the notification routing module 206, one or more notification queues 208, and application and server interfaces 210 may be adapted for cooperation and communication with the processor 216 and other components 108, 218, and 220 of the user device 106.

The channel creation module 200 may be software including routines for creating multiple communication channels between the user device 106 and the notification server 134. More specifically, the channel creation module 200 may create multiple communication channels between the multi-channel notification module 136 of the user device 106 and the multi-channel notification distributor 138 of the notification server 134. In some implementations, the channel creation module 200 may determine what communication channels are available for the user device 106. Different user devices 106 may have access to different notifications services and channels. For example, a first communication channel may be provided by a first operating system offering a mobile service that enables applications to send notification data or information from developer-run servers to applications that target the operating system. A second communication channel may be provided by a second service, for example, a cloud service, that forwards notifications of third party applications to the devices. A third communication channel may be provided by voice over internet protocol (VOIP) push notification services. These are only examples and the communication unit 220 of the user device 106 may establish any number of communication channels with the notification server 134. The channel creation module 200 may advantageously create two or more communication channels between the user device 106 and the notification server 134.

In some implementations, the notifications may include badges, sounds, custom text and/or graphical alerts, etc., to inform the user of an event has recently occurred or is currently happening within an application. For example, the notifications may be generated to notify the user of a file is uploaded/downloaded, an electronic message (e.g., email, text message, voice mail, etc.) is received, delivered or being sent, participation in or disconnection from a communication session (e.g., when the user or another user joins or leaves a conference), the user or another user is typing, self-watermark, focus, presence (e.g., available, away, etc.), etc. In some implementations, the notifications may be classified into different types of notifications (also referred to herein as message types). In some implementations, the notifications may be classified based on attributes of the notifications, for example, based on the events for which the notifications are triggered. Non-limiting examples of notification types are illustrated in FIG. 7. Other types of notification are also possible and contemplated.

In some implementations, each channel may have an associated category. Each category may have a defined set of message types that can be sent over the channel associated with the category. For example, a first channel may be assigned a high priority category and a second channel may be assigned a low priority category. The high priority category may include a defined set of message types that have high importance. For example, notifications of chat message delivered or being sent, join conference, leave conference or self-watermark may have high importance and channel creation module 200 will define notifications or messages of that message type as belonging to the high priority category and all other message types to a low priority category. While this example only includes two channels, it should be understood that there may be a similar division for any number of channels greater than two. For example, a third channel may be assigned a category of medium priority and message types may be defined or assigned to the medium priority category. In some implementations, each message type may be assigned exclusively to one category. In other implementations, a message type may be assigned to multiple categories. The operation of the channel creation module 200 will be described in more detail below with reference to FIG. 4. The channel creation module 200 may be coupled to the communication unit 220 to determine available communication channels, to the user interface module 204 to receive user input on channel categories and message types, to the notification type channel assignment storage 212 for storing channels, categories and message type assignments. The channel creation module 200 may also be coupled to the bus 214 for communication and interaction with the other components of the user device 106 and the system 100.

In some implementation, the channel creation module 200 may also deactivate a communication channel to conserve battery life, reduce network traffic, and reduce data usage. For example, when the applications associated with a channel are determined to be operational in the background, the channel may be deactivated. The process for deactivating a channel is described in more detail below with reference to FIG. 6. In some implementations, the deactivation may be performed by the channel creation module 200 in response to commands from the notification routing module 206. In other implementations, the notification routing module 206 may perform the deactivation of a channel.

The automatic channel set up module 202 may be software including routines for setting up multiple communication channels automatically based on user input. More specifically, one or more factors may be input or selected by the user and provided to the automatic channel set up module 202. A factor may include an attributes or characteristic of the computing device, the network, the communications channel or the server. Example factors may include, but are not limited to: network traffic, data usage, battery consumption, server resources, and reliability. The automatic channel set up module 202 may use the input factor and its ranking or its importance to automatically configure the number of communication channels, the categories assigned to the channels and message types associated with each category. In one implementation, each of the example factors may have a predefined profile specifying the number of communication channels, the categories assigned to the channels and message types associated with each category. When the factor is input, the automatic channel set up module 202 may use the profile associated with the factor to set up the channels, define the categories, define the assignment of the categories to the channels, and define the assignment of message types to the categories based on the profile. In other implementations, multiple factors may be input along with a weighting of importance. Based on the weighting and the factors provided, the automatic channel set up module 202 may select the channels, set up the channels, define the categories, define the assignment of the categories to the channels, and define the assignment of message types to the categories based on the profile. For example, the automatic channel set up module 202 may use a decision matrix, a ranked list, etc. In another implementation, each of the message types may have attributes matching the factors and an associated value. Depending on the factor to be improved or optimized, the automatic channel set up module 202 may assign message types to categories based on whether the values are above or below a threshold for the factor. For example, the message types with values below the threshold may be assigned to a first category and the message types with values above the threshold may be assigned to a second category. Each of the categories may then be assigned to a different channel. This is merely one example of how the automatic channel set up module 202 can configure the channels and categories based on a factor input alone. In some implementations, the automatic channel set up module 202 can configure the channels and categories based on multiple input factors. The operation of the automatic channel set up module 202 will be described in more detail below with reference to FIG. 5. The automatic channel set up module 202 may be coupled to the user interface module 204 to receive user input for a factor, to the notification type channel assignment storage 212 for retrieving profiles and storing channels, categories and message type assignments. The automatic channel set up module 202 may also be coupled to the bus 214 for communication and interaction with the other components of the user device 106 and the system 100.

The user interface module 204 may be software including routines for receiving user inputs and then sending those inputs to one or more other components of the multi-channel notification module 136 to perform their respective acts and/or functionalities thereon. In some implementations, a user input may include, for example, 1) the number of communication channels to establish and use, 2) two or more categories of notifications or messages; 3) the assignment of categories to channels, 4) one or more message types associated with each category, 5) a factor; 6) creation of channel profiles, 7) creation of categories; 8) naming of channels, categories, or message types, 9) any other information necessary to set up, use and configure channels, messages, and categories. In some implementations, the user interface module 204 may also be configured to generate a graphical user interface including a depiction of the number of channels, categories and message types and their associations with each other. This graphical user interface may then be output for display to the user. In some implementations, the user interface module 204 may perform its operations discussed herein in cooperation with one or more components of the multi-channel notification module 136. For instance, the user interface module 204 may send received inputs to the channel creation module 200, the automatic channel set up module 202, the notification routing module 206, and application and server interfaces 210. The user interface module 204 may also be coupled to the bus 214 for communication and interaction with the other components of the user device 106 and the system 100.

The notification routing module 206 may be software including routines for processing notifications at the multi-channel notification module 136 and at the multi-channel notification distributor 138. A notification may be received by the notification server 134, processed by the multi-channel notification distributor 138 and sent to the multi-channel notification module 136 on one of the plurality of communication channels. The notification may then be processed by the multi-channel notification module 136 before delivery to the user application 108. In some implementations, the notification routing module 206 may process the notification at the multi-channel notification module 136. In some implementations, the notification routing module 206 may process the notification at the multi-channel notification distributor 138. In still other embodiments, the notification routing module 206 at the multi-channel notification module 136 and the notification routing module 206 at the multi-channel notification distributor 138 may share the processing of the notification. The notification routing module 206 will be described in more detail below with reference to FIG. 3. The notification routing module 206 may be coupled to the user interface module 204 to receive user input, to the notification type channel assignment storage 212 for determining how to route messages, and to the application and server interfaces 210 to send and receive notifications and other information. The notification routing module 206 may also be coupled to the bus 214 for communication and interaction with the other components of the user device 106 and the system 100. The notification routing module 206 may process the notifications and send them on one of the multiple channels to reduce traffic over the network, reduce data usage for the user device 106, reduce battery consumption by the user device 106, reduce the server resources needed to send push notifications, and increase reliability.

When operating as part of the multi-channel notification distributor 138, the notification routing module 206 may receive a notification, for example from the application server 142, determine the notification type, determine the category assigned to the notification type, and then identify the channel associated with the category. Once the channel for transmission is determined, the notification routing module 206 may send the notification on the identified channel from the notification routing module 206 at the multi-channel notification distributor 138 to the notification routing module 206 at the multi-channel notification module 136. In some implementations, the multi-channel notification distributor 138 may receive signals indicating that particular applications are operational in the foreground or background as well as other state information. Depending on the operation state of the application, the notification routing module 206 may store the notification in the notification queues 208 for later delivery, not deliver the notification, or send the notification on a higher priority channel. For example, notifications describing an ephemeral state of another user (e.g., another user is typing) can be ignored or deleted and not delivered to a recipient (e.g., the user 114 of the user device 106) if the application corresponding to the notification is operational in the background. Further, in some implementations, if an application remains operational in the background for a predefined amount of time, one or more of the channels assigned to corresponding categories of its notifications may be deactivated to save battery consumption of the user device 106. The notification routing module 206 may process the notifications and adjust the usage and operation of the channels to achieve the advantages described elsewhere herein. It should be understood that there may be multiple applications operating in the background or multiple applications operating in the foreground, and additional communication channels may be established for each application. For example, two applications operating in background sharing a channel or having separate channels for sending and receiving messages. Similarly for applications operating in the foreground.

When operating as part of the multi-channel notification module 136, the notification routing module 206 may receive a notification on one of a plurality of communication channels. Since each communication channel may have predefined categories and properties, the notification routing module 206 can process the notification accordingly. The notification routing module 206 may determine the channel upon which the notification was received. The notification routing module 206 may then determine the category assigned to the channel. For example, the channel categories could be one for high priority and another for low priority. The notification routing module 206 may then store the message in the notification queues 208 if the category of the channel is a low priority. The notification routing module 206 may then process the notification based on the determined category for the notification. For example, if the notification is received on a high priority channel, the notification may be sent to the user even though an application is operating in the background. In contrast, a notification received on a low priority channel may be stored in a queue 208 for later presentation to the user or may be discarded (e.g., deleted, removed, etc.) completely. More specifically, in some implementations, if a new chat message arrives on a high priority channel, the notification will be process even though the corresponding messaging application 108 may be operational in the background on the user device 106. This allows more applications 108 to be operational in the background and thereby conserving battery consumption, while still processing important notifications because they were sent on the appropriate channel to the application 108.

The one or more notification queues 208 may be buffers or other data structures in memory 218 for storing notifications. In one implementation, there may be one notification queue 208 for each communication channel. The notification queues 208 may be used to buffer the notifications at the notification server 134 before transmission over the channel to the user device 106, or to buffer the notifications at the user device 106 after receipt on a channel but before delivery to the application 108. In some implementations, the notification queues 208 may have a fixed length to store a predetermined number of notifications, e.g., 10. In some embodiments, different channels may have different queue lengths. In still another implementation, only selected channels may be provided with notification queues 208. For example, in a configuration where there is a high priority channel and a low priority channel, only the low priority channel may need a notification queue 208 because the high priority notifications are processed immediately without the need to store or buffer them. The notification queues 208 may be coupled to receive and send notifications from the channels and/or the notification routing module 206 under the control of the multi-channel notification module 136 or the multi-channel notification distributor 138.

The application and server interfaces 210 may be software including routines for communicating with the application 108, and the application server 142 or notification server 134. The application and server interfaces 210 may provide a communication and interaction mechanism between the multi-channel notification module 136 and the application 108. In addition to sending and receiving notifications, the application 108 may send other information such as operational state to the multi-channel notification module 136. The application and server interfaces 210 may provide a communication and interaction mechanism between the multi-channel notification distributor 138 and the application server 142 or notification server 134. In addition to sending and receiving notifications, the application server 142 or notification server 134 may send and receive other information such as operational state to and from the application 108. The application and server interfaces 210 are coupled for communication and cooperation with the application 108, the application server 142 and notification server 134.

The notification type channel assignment storage 212 is storage or memory for storing the assignment of categories to channel and the assignment of message types to categories. An example data structure for storing this information will be described in more detail below with reference to FIG. 7. The notification type channel assignment storage 212 may be accessed by the channel creation module 200, the automatic channel set up module 202, the user interface module 204, and the notification routing module 206 for performing their respective functions described elsewhere herein. The notification type channel assignment storage 212 can be updated based on user input, for example, by the channel creation module 200 or the automatic channel set up module 202. Once the channel categories and assignments have been created, the notification type channel assignment storage 212 may be accessed by the notification routing module 206 for routing notifications. In some implementations, the notification type channel assignment storage 212 may store other information, for example, operational state of application and other state information that is used by the notification routing module 206 for processing notifications. The notification type channel assignment storage 212 may be coupled for communication and interaction with the automatic channel set up module 202, the user interface module 204, and the notification routing module 206. The notification type channel assignment storage 212 may also be coupled to the bus 214 for communication and interaction with the other components of the user device 106 and the system 100.

Referring now to FIG. 2B, a block diagram of an example computing device, which may be representative of the notification server 134 is described. As depicted, the notification server 134 may include a processor 216, a memory 218, a communication unit 220, and a data store 222, which may be communicatively coupled by a communication bus 214. The memory 218 may include the multi-channel notification distributor 138 and the notification type channel assignment storage 212. The processor 216, memory 218, communication unit 220, data store 222, and the notification type channel assignment storage 212 are similar in form and functions to those components described above with reference to FIG. 2A, and thus detailed descriptions thereof will be omitted. Like reference numerals have been used to identify like components with the same or similar functionality.

The multi-channel notification distributor 138 may include a channel creation module 200, an automatic channel set up module 202, a user interface module 204, a notification routing module 206, one or more notification queues 208 and an application and server interfaces 210. Again, these components are similar in form and functions to the components described above with reference to FIG. 2A, so that description will not be repeated here. Like reference numerals have been used to identify like components with the same or similar functionality. The above description includes differentiation for these components when they are operational as part of the multi-channel notification distributor 138 or the multi-channel notification module 136.

Methods

Figure 3:
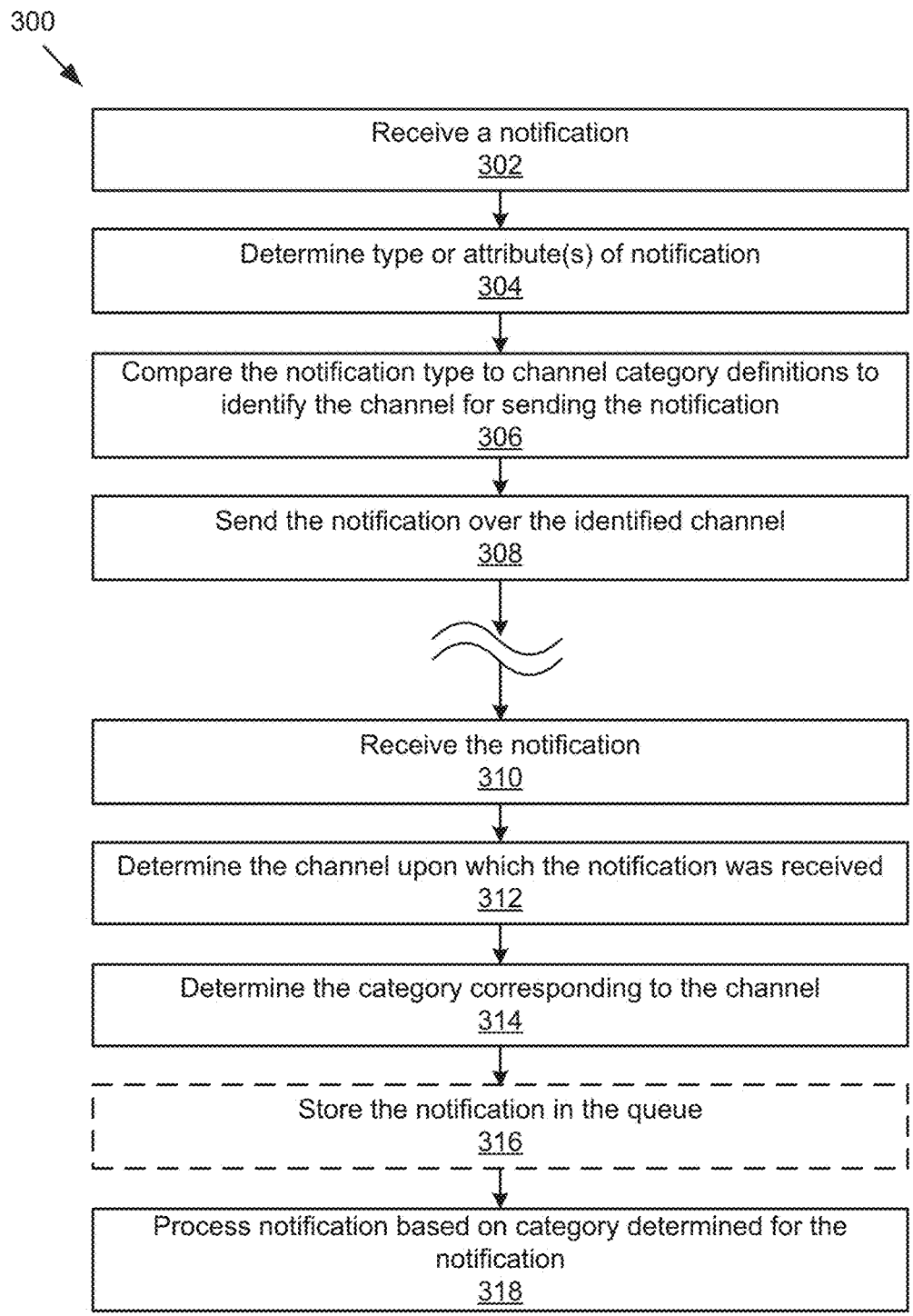
FIG. 3 is a flowchart illustrating an example method for sending notifications over multiple channels in accordance with the present disclosure.

FIG. 3 is a flowchart illustrating an example method 300 for sending notifications over multiple channels in accordance with the present disclosure. The method 300 begins by receiving 302 a notification. In some implementations, a notification may be received by the notification server 134, processed by the multi-channel notification distributor 138 and sent to the multi-channel notification module 136 on one of the plurality of communication channels, then the notification may be processed by the multi-channel notification module 136 before delivery to the user application 108. In block 302, the notification is received by the notification routing module 206 of the notification server 134. The notification can be sent from the application server 142 or from the application 108 to the notification server 134 for routing by the notification server 134, specifically the notification routing module 206 of the notification server 134, to the application 108, another application or the application server 142. The method 300 continues by determining 304 the type of the notification. For example, the notification type may be used to determine the channel for routing of the notification. In other implementations, the attributes of the notification may be used to determine the channel upon which to transmit the notification. These attributes may be the same as the categories in some implementations. Next, the method 300 compares 306 the type of the notification to the channel category definitions to identify the channel upon which to send the notification. As noted above, in some implementations, when the channels are created, they may be assigned one or more categories. The categories may have associated message types. Thus, if the message type (e.g., the type of the notification) is known, the corresponding channel for sending the message (e.g., the notification) can be determined. Then the method 300 sends 308 the notification over the identified channel from the multi-channel notification distributor 138 to the multi-channel notification module 136. While blocks 302, 304, 306, 308 have been described above as being performed by the notification routing module 206 of the notification server 134, is should be understood that in other implementations, the blocks 302, 304, 306, 308 may be performed by the notification routing module 206 of the application server 142.

Still referring to FIG. 3, the method 300 continues by processing the notification at the notification routing module 206 of the multi-channel notification module 136. The multi-channel notification module 136 receives 310 the notification on one of multiple channels coupling the multi-channel notification distributor 138 to the multi-channel notification module 136. The method 300 proceeds with the multi-channel notification module 136 determining 312 the channel upon which the notification was received. Next, the multi-channel notification module 136 determines 314 the category corresponding to the channel. For example, the multi-channel notification module 136 can access the notification type channel assignment storage 212 to determine the category assigned to the channel. In some implementations, the method 300 continues by storing 316 the notification in the notification queue 208 for later use or later processing. This block 316 is shown with dashed lines indicating that it is optional.

The method 300 completes by processing 318 the notification based on its category as determined in block 314. For example, in one implementation, notifications in the high priority category may be sent to the application 108 if it is operating in the foreground. If not, the application 108 may be moved to the foreground and the message may be sent to the application 108. Alternatively, the message in the high priority category may be sent to the application 108 regardless of whether the application 108 is in the foreground or in the background. For example, the message may be delivered to the application 108 (e.g., a social networking application) to update the badge indicating the number of unread stories in the newsfeed while the social networking application 108 is kept in the background. On the other hand, if the category for the notification is low priority, the message may be stored in notification queue 208 in block 316 or discarded in block 318. Alternatively, the message in the low priority category can still be sent to the application 108 if it is operating in the foreground. In another example, the category for the first channel may be ephemeral and a category for the second channel may be permanent. For notifications that are in the ephemeral category, they may be discarded in block 318 if the application 108 is in the background and may be delivered if the application 108 is in the foreground. For notifications that are in the permanent category, they may be stored in notification queue 208 if the application 108 is operating in the background and may be sent to the application 108 if the application is operating in the foreground. These are merely a few examples of the processing based on category performed in block 318. It should be understood that the present disclosure contemplates a variety of other configurations for processing notifications based on the category and other factors.

Figure 4:
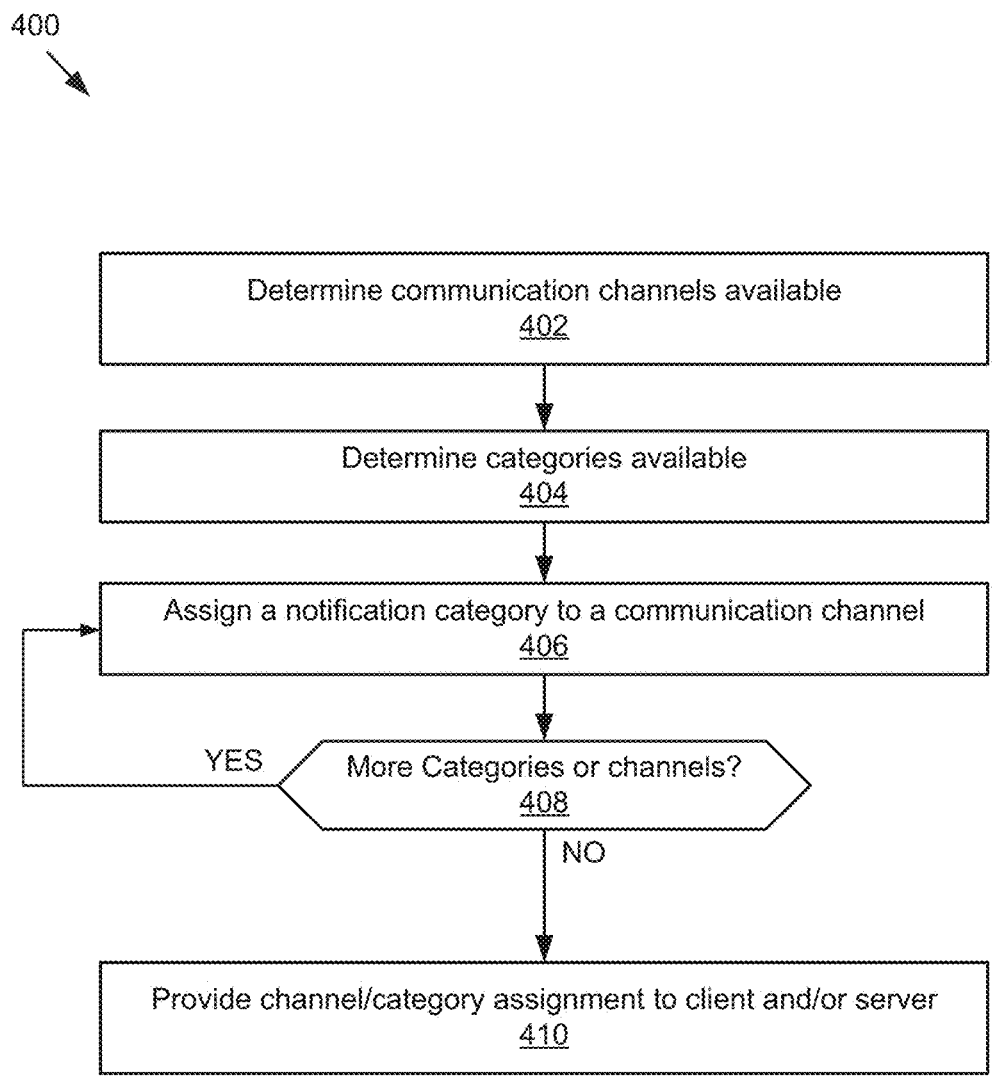
FIG. 4 is a flowchart illustrating an example method for establishing channels in accordance with the present disclosure.

FIG. 4 is a flowchart illustrating an example method 400 for establishing or creating channels in accordance with the present disclosure. In some implementations, the method 400 may be performed by the channel creation module 200. The method 400 begins by determining 402 the communication channels available for the user device 106 to communicate with the notification server 138. The operating system of the user device 106 typically provides two or more communication channels for communicating with external devices. For example, as described above, the user device 106 may be enabled to use a push notification service, a cloud messaging service and a VoIP notification service. Each of these notification services may have different characteristics or attributes which may also be used in subsequent steps to match the channel characteristics to the notification category. Then the method 400 determines 404 the notification categories available to be assigned to the communication channels. The channel creation module 200 can do this by accessing a data structure stored in the notification type assignment channel assignment storage. An example of a table data structure identifying categories and message types is shown in FIG. 7. Next, the method 400 assigns 406 a notification category to a communication channel. In some implementations, assignment may be done manually based on user input provided via the user interface module 204 cooperating with the channel creation module 200. In other implementations, assignment may be done automatically based on a profile or input of another factor (see also FIG. 5). Next, the method 400 determines 408 whether there is another channel that does not have an assigned category. If so, the method returns to block 406 to assign a category to that channel. If not, the method 400 continues to block 410. It should be understood that in some implementations, blocks 406 and 408 may be repeated until there are at least two channels that have been set up. In some implementations, blocks 406 and 408 may be repeated for every available channel. Further, it should be noted that in some implementations, multiple categories may be assigned to a particular channel. Then the method 400 completes by providing the channel/category assignments to the user device 106 and the notification server 134. More specifically, the multi-channel notification module 136 and the multi-channel notification distributor 138 are provided with the channel/category assignments so they can communicate with each other. The channel/category assignments may also be stored in the notification type channel assignment storage 212 of the user device 106 and notification server 134 for access and use by their components.

Figure 5:
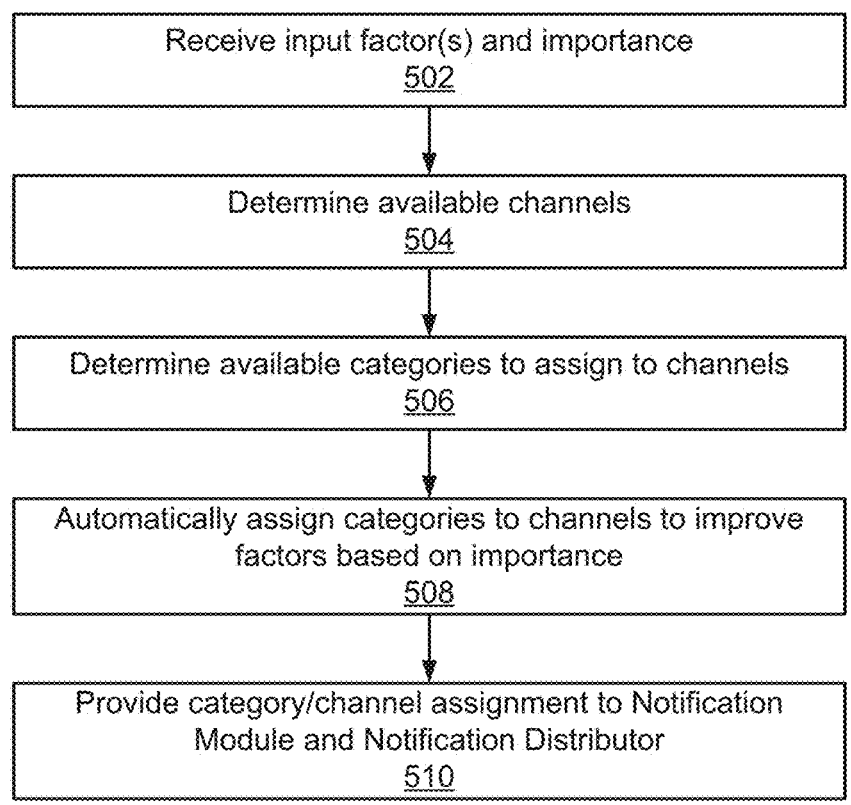
FIG. 5 is a flowchart illustrating an example method for automatic channel set up in accordance with the present disclosure.

FIG. 5 is a flowchart illustrating an example method 500 for automatic channel set up in accordance with the present disclosure. In some implementations, the method 500 may be performed by the automatic channel set up module 202. The method 500 begins by receiving 502 an input factor. In some implementations, a single factor may be input by the user and the automatic channel set up module 202 may configure the channels and categories to improve performance or optimize that one input factor. In other implementations, the user may input a plurality of factors and an importance or rank for each factor. Based on the factors and their importance, the automatic channel set up module 202 may configure the channels and categories to improve performance of the input factors using the importance for weighting. Next, the method 500 determines 504 the communication channels available for the user device 106 to communicate with the notification server 138. As noted above, the operating system of the user device 106 typically provides two or more communication channels for communicating with external devices. For example, as described above, the user device 106 may be enabled to use a push notification service, a cloud messaging service and a VoIP notification service. Each of these notification services may have different characteristics which may also be used in subsequent steps to match the channel characteristics to the notification category. Then the method 500 determines 506 the notification categories available to be assigned to the communication channels. The automatic channel set up module 202 can do this by accessing a data structure stored in the notification type assignment channel assignment storage. Next, the method 500 assigns 508 a notification category to at least a plurality of communication channels. The assignments are preferably done automatically based on a profile or input of another factor. For example, the assignment of a category to a channel can be done automatically using the automatic set up channel module 202 as has been described above. Next, the method 500 completes by providing 510 the channel/category assignments to the user device 106 and the notification server 134. More specifically, the multi-channel notification module 136 and the multi-channel notification distributor 138 are provided with the channel/category assignments so they can communicate with each other. The channel/category assignments may also be stored in the notification type channel assignment storage 212 of the user device 106 and notification server 134 for access and use by their components.

Figure 6:
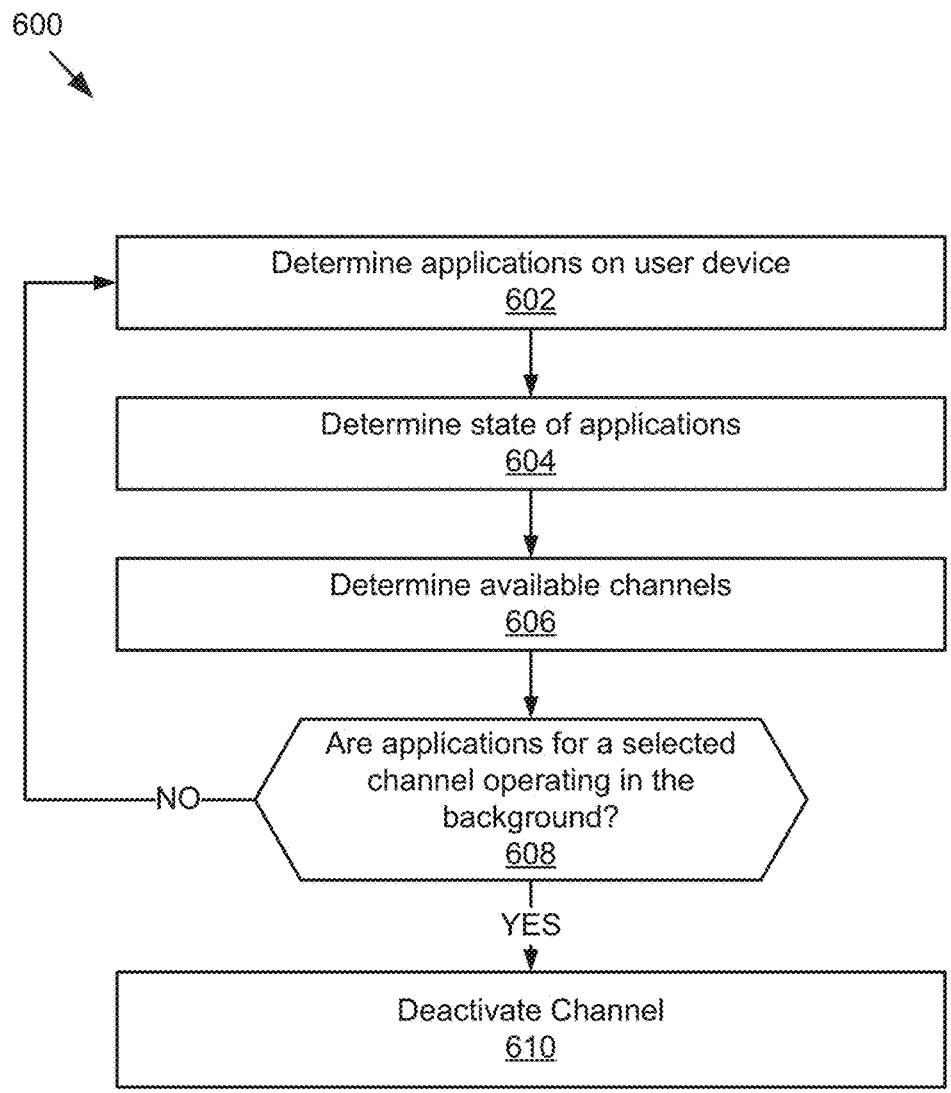
FIG. 6 is a flowchart illustrating an example method for deactivating a channel in accordance with the present disclosure.

FIG. 6 is a flowchart illustrating an example method 600 for deactivating a channel in accordance with the present disclosure. As noted above, the channel creation module 200 may deactivate a communication channel to reduce battery consumption if all the applications associated with that channel are inactive or operating in the background. The method 600 begins by determining 602 the applications installed on the user device 106. Next, the method 600 determines 604 the operational state of the applications determined from block 602. The method 600 continues to determine 606 available channels used for notifications and the categories assigned to the channels. The method 600 determines 608 whether there is a selected channel where the applications using the channel for communication are operating in the background. If not, the method 600 continues to monitor the operational state and of the applications by looping to block 602 and repeating steps 604 to 606. On the other hand, if the method 600 determined in block 608 that there is a selected channel where the applications using the channel for communication are operating in the background, then the method 600 deactivates 610 the channel to reduce battery consumption and save data usage.

FIG. 7 is a graphical representation of a data structure 700 illustrating example notification types, notification categories and associations between channels and categories. As depicted, the data structure 700 includes rows of notifications types 702, columns defining category membership 704, and a row of channel assignments 706. In some embodiments, this data structure 700 may be stored in the notification type channel assignment storage 212. In this example, a check mark in a particular row and column indicates that the message type is included in the category. The channel assignments 706 are shown in a bottom row of the table where the channel designation in the column corresponding to the category shows the channel assigned to the category. In this example, there are a number of notification types including, but not limited to, typing, focused, away, self-watermark, send chat message, join conference, leave conference, active client, active user, presence, update, alert, event occurring, data for download (e.g., new version of an application is available), status (e.g., electronic messages arrived/delivered/read/unread, etc.), nearby user device detected, etc. Other types of notification are also possible and contemplated. In this example, there are a number of categories including, but not limited to, high priority, low priority, permanent state, ephemeral state, family, others, background, foreground, etc. Other categories are also possible and contemplated. While some of the categories are shown as being mutually exclusive in notification type membership (e.g., categories High Priority and Low Priority as depicted in FIG. 7), this needs not necessarily be the case and a message type could belong to two types of categories (e.g., categories Family and Others).

In situations in which the systems and methods discussed herein may collect or use personal information about users (e.g., user data, information about a user's social network, user's location, user's biometric information, user's activities and demographic information), users are provided with one or more opportunities to control whether the personal information is collected, whether the personal information is stored, whether the personal information is used, and how the information is collected about the user, stored and used. That is, the systems and methods discussed herein collect, store and/or use user personal information only upon receiving explicit authorization from the relevant users to do so. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

Reference in the specification to "some implementations" or "an implementation" means that a particular feature, structure, or characteristic described in connection with the implementation is included in at least some instances of the description. The appearances of the phrase "in some implementations" in various places in the specification are not necessarily all referring to the same implementation.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware implementations, an entirely software implementation or implementations containing both hardware and software elements. In some implementations, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or social network data stores through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be implemented in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
   establishing a first communication channel with a computing device;
   establishing a second communication channel with the computing device;
   associating a first category with the first communication channel, the first category having a first set of message types;
   associating a second category with the second communication channel the second category having a second set of message types;
   receiving a message;
   determining whether a category for the message from is the first category;
   identifying an application on the computing device associated with the message;
   determining whether the application is operating in a background of the computing device;
   responsive to determining that the application is operating in the background of the computing device, deactivating the second communication channel associated with the second category; and
   responsive to deactivating the second communication channel associated with the second category and determining that the category for the message is the first category, sending the message to the computing device using the first communication channel associated with the first category.

2. The computer-implemented method of claim 1, wherein determining the category for the message further comprises:
   determining a type of the message; and
   comparing the type of the message to the first set of message types and the second set of message types to identify the determined category for the message.

3. The computer-implemented method of claim 1, wherein the computing device is a portable computing device and the message is a push notification for a mobile application operating on the portable computing device.

4. The computer-implemented method of claim 1, wherein the first communication channel is for high priority messages and the second communication channel is for low priority messages.

5. The computer-implemented method of claim 1, further comprising:
   responsive to deactivating the second communication channel associated with the second category and determining that the category for the message is not the first category, discarding the message.

6. The computer-implemented method of claim 1 further comprising:
   receiving a factor for communication using the first communication channel and the second communication channel;

determining categories available to assign to the first communication channel and the second communication channel; and automatically assigning the categories to the first communication channel and the second communication channel to improve performance of the factor.

7. The computer-implemented method of claim 6 wherein the factor is one from the group of traffic between the computing device and a server, data usage by the computing device, battery consumption by the computing device, reliability of message delivery, and utilization of resources of the server.

8. A system comprising:
a processor; and
a memory storing instructions that, when executed, cause the system to perform operations comprising:
establishing a first communication channel with a computing device;
establishing a second communication channel with the computing device;
associating a first category with the first communication channel, the first category having a first set of message types;
associating a second category with the second communication channel the second category having a second set of message types;
receiving a message;
determining whether a category for the message is the first category;
identifying an application on the computing device associated with the message;
determining whether the application is operating in a background of the computing device;
responsive to determining that the application is operating in the background of the computing device, deactivating the second communication channel associated with the second category; and
responsive to deactivating the second communication channel associated with the second category and determining that the category for the message is the first category, sending the message to the computing device using the first communication channel associated with the first category.

9. The system of claim 8, wherein the operations further comprise:
determining a type of the message; and
comparing the type of the message to the first set of message types and the second set of message types to identify the determined category for the message.

10. The system of claim 8, wherein the computing device is a portable computing device and the message is a push notification for a mobile application operating on the portable computing device.

11. The system of claim 8, wherein the first communication channel is for high priority messages and the second communication channel is for low priority messages.

12. The system of claim 8, wherein the operations further comprise:
responsive to deactivating the second communication channel associated with the second category and determining that the category for the message is not the first category, discarding the message.

13. The system of claim 8, wherein the operations further comprise:
receiving a factor for communication using the first communication channel and the second communication channel;

determining categories available to assign to the first communication channel and the second communication channel; and automatically assigning the categories to the first communication channel and the second communication channel to improve performance of the factor.

14. The system of claim 13, wherein the factor is one from the group of traffic between the computing device and a server, data usage by the computing device, battery consumption by the computing device, reliability of message delivery, and utilization of resources of the server.

15. A computer program product comprising a non-transitory computer readable medium including a computer readable program, wherein the computer readable program when executed on a computer causers the computer to perform operations comprising:
establishing a first communication channel with a computing device;
establishing a second communication channel with the computing device;
associating a first category with the first communication channel, the first category having a first set of message types;
associating a second category with the second communication channel the second category having a second set of message types;
receiving a message;
determining whether a category for the message is the first category;
identifying an application on the computing device associated with the message;
determining whether the application is operating in a background of the computing device;
responsive to determining that the application is operating in the background of the computing device, deactivating the second communication channel associated with the second category; and
responsive to deactivating the second communication channel associated with the second category and determining that the category for the message is the first category, sending the message to the computing device using the first communication channel associated with the first category.

16. The computer program product of claim 15, wherein determining the category for the message further comprises:
determining a type of the message; and
comparing the type of the message to the first set of message types and the second set of message types to identify the determined category for the message.

17. The computer program product of claim 15, wherein the computing device is a portable computing device and the message is a push notification for a mobile application operating on the portable computing device.

18. The computer program product of claim 15, wherein the first communication channel is for high priority messages and the second communication channel is for low priority messages.

19. The computer program product of claim 15, wherein the operations further comprise:
responsive to deactivating the second communication channel associated with the second category and determining that the category for the message is not the first category, discarding the message.

20. The computer program product of claim 15, wherein the operations further comprise:

receiving a factor for communication using the first communication channel and the second communication channel;

determining categories available to assign to the first communication channel and the second communication channel; and automatically assigning the categories to the first communication channel and the second communication channel to improve performance of the factor.

21. The computer-implemented method of claim 20 wherein the factor is one from the group of traffic between the computing device and a server, data usage by the computing device, battery consumption by the computing device, reliability of message delivery, and utilization of resources of the server.

* * * * *